United States Patent
Byun et al.

(10) Patent No.: US 9,059,459 B2
(45) Date of Patent: Jun. 16, 2015

(54) SECONDARY BATTERY

(75) Inventors: Sang-Won Byun, Yongin-si (KR); Yong-Sam Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/868,646

(22) Filed: Aug. 25, 2010

(65) Prior Publication Data
US 2011/0244280 A1 Oct. 6, 2011

Related U.S. Application Data

(60) Provisional application No. 61/319,110, filed on Mar. 30, 2010.

(51) Int. Cl.
| | |
|---|---|
| *H01M 2/00* | (2006.01) |
| *H01M 2/34* | (2006.01) |
| *H01M 2/04* | (2006.01) |
| *H01M 2/30* | (2006.01) |
| *H01M 10/02* | (2006.01) |
| *H01M 10/052* | (2010.01) |

(Continued)

(52) U.S. Cl.
CPC ............ *H01M 2/348* (2013.01); *H01M 2/0404* (2013.01); *H01M 2/30* (2013.01); *H01M 2/34* (2013.01); *H01M 10/02* (2013.01); *H01M 10/052* (2013.01); *H01M 10/0585* (2013.01); *H01M 10/0587* (2013.01); *H01M 2200/00* (2013.01); *H01M 2200/103* (2013.01); *Y02E 60/122* (2013.01)

(58) Field of Classification Search
CPC . Y02E 60/12; Y02E 60/122; H01M 10/0585; H01M 10/5026; H01M 4/0404; H01M 8/0269; H01M 2/30; H01M 2/0202; H01M 2/34; H01M 2200/00; H01M 2200/103; H01M 2/348; H01M 2/404
See application file for complete search history.

(56) References Cited

U.S. PATENT DOCUMENTS

| | | | | |
|---|---|---|---|---|
| 5,204,194 | A | * | 4/1993 | Miller et al. ...................... 429/7 |
| 6,440,601 | B1 | * | 8/2002 | Aoi et al. ......................... 429/96 |
| 8,318,337 | B2 | * | 11/2012 | Yokoyama et al. ........... 429/161 |

(Continued)

FOREIGN PATENT DOCUMENTS

| | | |
|---|---|---|
| EP | 1 482 577 A1 | 12/2004 |
| EP | 2 348 558 A1 | 7/2011 |

(Continued)

OTHER PUBLICATIONS

Machine Translation of KR2003-0025077—Mar. 28, 2003.*

(Continued)

*Primary Examiner* — Ula C Ruddock
*Assistant Examiner* — Lisa S Park Gehrke
(74) *Attorney, Agent, or Firm* — Christie, Parker & Hale LLP (57) ABSTRACT

A secondary battery including an electrode assembly including a first electrode plate, a second electrode plate, and a separator between the first electrode plate and the second electrode plate; a case containing the electrode assembly; an electrode terminal electrically connected to the first electrode plate; a current collector coupled between and electrically connecting the first electrode plate and the electrode terminal, the current collector including a fuse portion; and an insulating unit on the fuse portion of the current collector.

15 Claims, 7 Drawing Sheets

(51) Int. Cl.
  *H01M 10/0585* (2010.01)
  *H01M 10/0587* (2010.01)

(56) References Cited

U.S. PATENT DOCUMENTS

| | | | |
|---|---|---|---|
| 2003/0077484 A1* | 4/2003 | Cho | 429/7 |
| 2004/0092167 A1 | 5/2004 | Barrault et al. | |
| 2004/0166405 A1 | 8/2004 | Senda et al. | |
| 2004/0170887 A1 | 9/2004 | Masumoto et al. | |
| 2009/0291330 A1* | 11/2009 | Onnerud et al. | 429/7 |

FOREIGN PATENT DOCUMENTS

| | | |
|---|---|---|
| JP | 08-185850 | 7/1996 |
| JP | 10-188946 | 7/1998 |
| JP | 2003-178745 | 6/2003 |
| JP | 2004-521459 | 7/2004 |
| KR | 10-2003-0025077 | 3/2003 |

OTHER PUBLICATIONS

Extended European Search Report dated Nov. 2, 2010 issued in corresponding European application No. 10169767.0, listing the cited references in this IDS.
Patent Abstracts of Japan, and English machine translation of Japanese Publication 08-185850, 20 pages.
European Office action dated Oct. 11, 2011, for corresponding European Patent application 10169767.0, noting listed reference in this IDS, 4 pages.
JPO Office action dated Feb. 5, 2013, for corresponding Japanese Patent application 2011-051266, (2 pages).
Patent Abstracts of Japan, and English machine translation of Japanese Publication 10-188946 listed above, (13 pages).
English translation of Korean Office action mailed Jul. 25, 2011 for Korean Patent Application No. KR 10-2010-0058223 (2 pgs.).
SIPO Office action dated Jul. 1, 2014, with English translation, for corresponding Chinese Patent application 201110083701.2, (15 pages).

* cited by examiner

SECONDARY BATTERY

CROSS-REFERENCE TO RELATED APPLICATION

This application claims the benefit of U.S. Provisional Application No. 61/319,110, filed on Mar. 30, 2010 in the United States Patent and Trademark Office, the disclosure of which is incorporated herein in its entirety by reference.

BACKGROUND

1. Field

Aspects of embodiments of the present invention relate to a secondary battery, and more particularly, to a secondary battery protected by operating a fuse when an overcurrent flows due to overcharging or an abnormal phenomenon.

2. Description of the Related Art

Unlike primary batteries that are not rechargeable, secondary batteries are rechargeable batteries. Secondary batteries are widely used in high-tech electronic devices such as cellular phones, notebook computers, and camcorders, and also are used in vehicles.

A secondary battery includes an electrode assembly and an electrolyte. The electrode assembly includes positive and negative electrode plates and a separator. The electrolyte includes lithium (Li) ions in many cases. The positive and negative electrode plates of the electrode assembly may include electrode tabs protruding outward.

The electrode assembly may be accommodated in a case and electrode terminals may be exposed outside the case. The electrode tabs may protrude outside the electrode assembly so as to be electrically connected to the electrode terminals. The case may have a cylindrical shape or a rectangular shape.

SUMMARY

According to an aspect of embodiments of the present invention, a secondary battery is capable of preventing or substantially preventing an explosion even when an overcurrent flows due to overcharging or an abnormal phenomenon.

According to an embodiment of the present invention, a secondary battery includes an electrode assembly including a first electrode plate, a second electrode plate, and a separator between the first electrode plate and the second electrode plate; a case containing the electrode assembly; an electrode terminal electrically connected to the first electrode plate; a current collector coupled between and electrically connecting the first electrode plate and the electrode terminal, the current collector including a fuse portion; and an insulating unit on the fuse portion of the current collector.

In one embodiment, the insulating unit has a larger surface than the fuse portion. In one embodiment, the fuse portion has a smaller cross-sectional area than other portions of the current collector. The fuse portion may have a higher resistance than other portions of the current collector.

In one embodiment, the electrode terminal protrudes outside the case. In one embodiment, a secondary battery further includes a cap plate sealing an opening of the case, wherein the electrode terminal protrudes through a terminal hole formed in the cap plate.

The insulating unit may include at least one of an insulating tape or an insulation molding. The current collector may be formed as a single integral piece.

In one embodiment, the current collector includes a current collecting plate coupled to the first electrode plate; and a lead member coupled to the electrode terminal and the current collecting plate. The lead member may include a terminal lead unit coupled to the electrode terminal; and a current collecting lead unit extending from the terminal lead unit and coupled to the current collecting plate. In one embodiment, the current collecting lead unit includes the fuse portion. In one embodiment, the terminal lead unit includes the fuse portion. The fuse portion may be integrally formed on the lead member and may have a smaller cross-sectional area than other portions of the lead member.

In one embodiment, the electrode terminal is a first electrode terminal, and the secondary battery further includes a second electrode terminal electrically connected to the second electrode plate and protruding outside the case, and the current collector is a first current collector, and the secondary battery further includes a second current collector coupled between and electrically connecting the second electrode plate and the second electrode terminal. In one embodiment, the first electrode plate is a positive electrode plate and the first current collector is a positive current collector, and the second electrode plate is a negative electrode plate and the second current collector is a negative current collector. In one embodiment, the first current collector includes aluminum, and the second current collector includes copper.

The fuse portion may be configured to melt and disconnect the first electrode plate from the electrode terminal when a current having a magnitude greater than or equal to a set current flows through the current collector.

A secondary battery according to one or more embodiments of the present invention may prevent or substantially prevent an explosion even when an overcurrent flows due to overcharging or an abnormal phenomenon.

BRIEF DESCRIPTION OF THE DRAWINGS

The above and other features and advantages will become more apparent to those of ordinary skill in the art by describing in detail some exemplary embodiments of the present invention with reference to the attached drawings. The drawings illustrate some exemplary embodiments of the present invention and, together with the description, serve to explain principles and provide a further understanding of the present invention.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Figure 1:
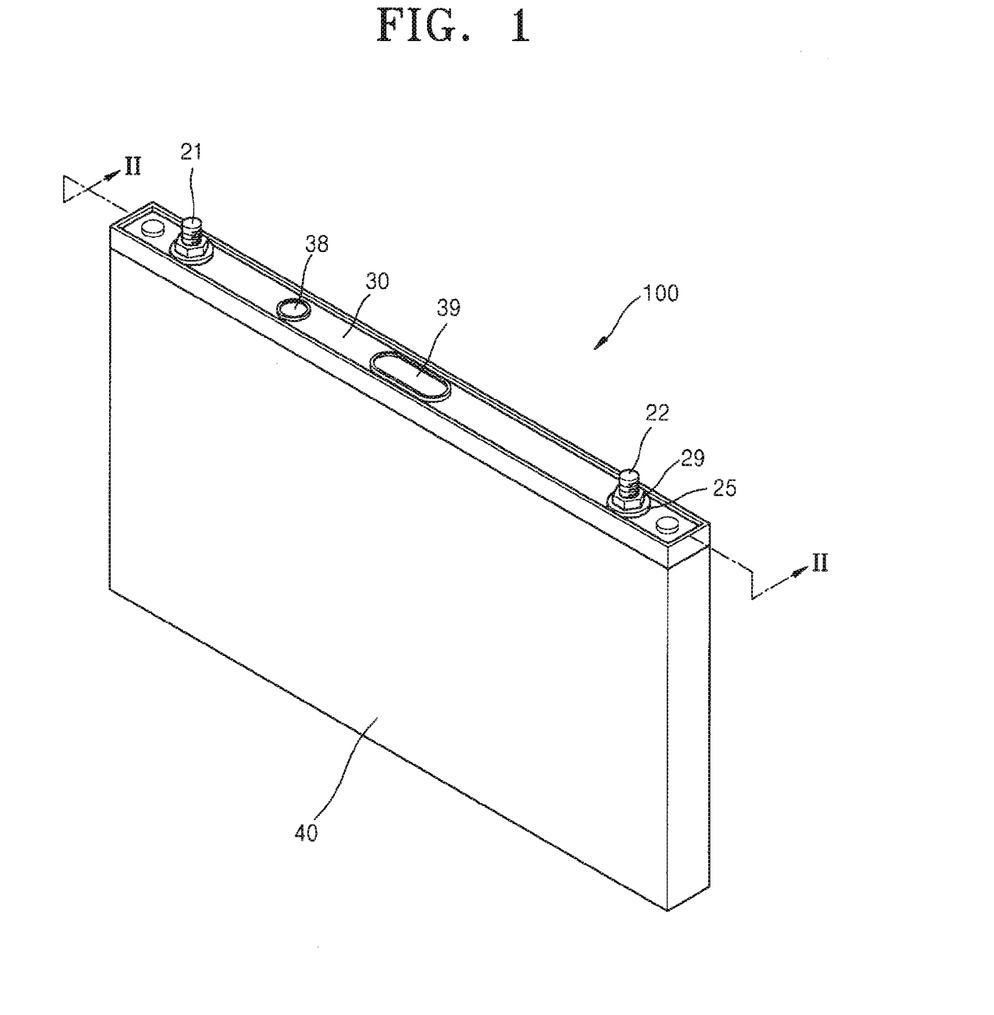
FIG. 1 is a perspective view of a secondary battery according to an embodiment of the present invention.
Figure 2:
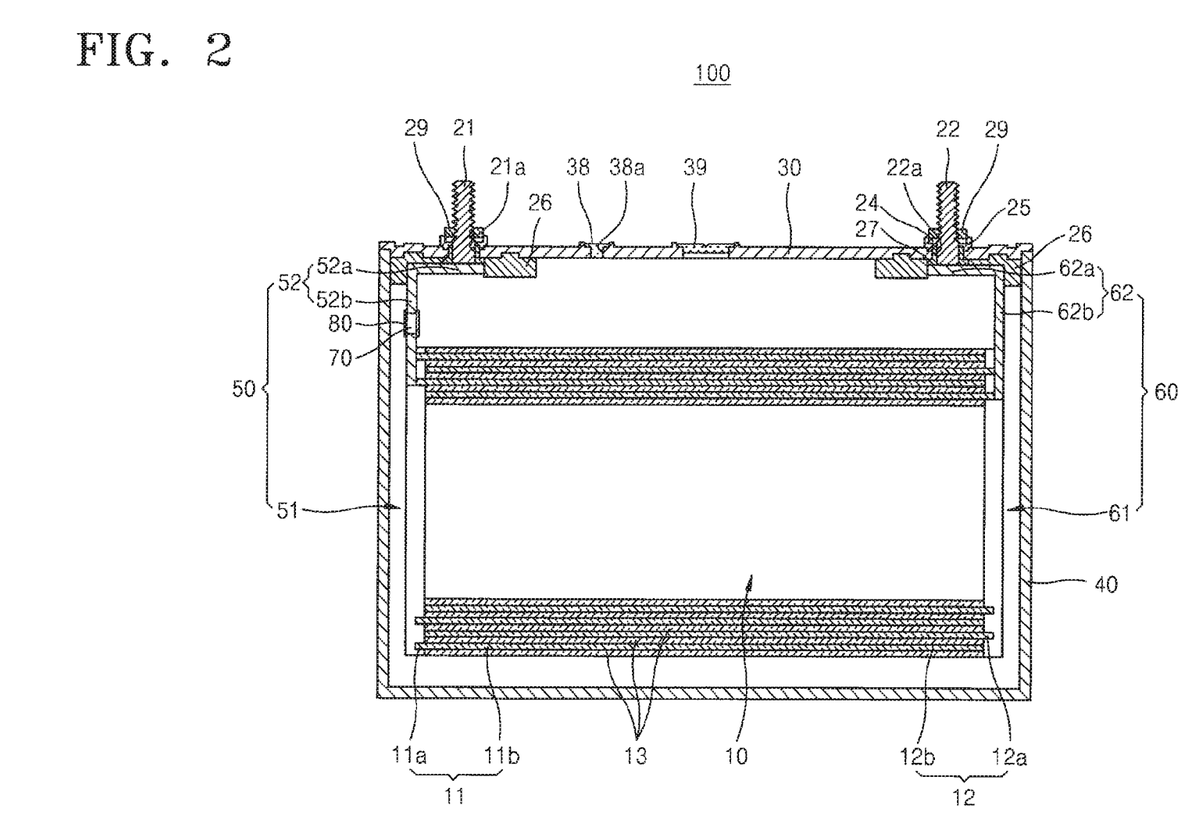
FIG. 2 is a cross-sectional view of the secondary battery of FIG. 1 taken along line II-II.

FIG. 1 is a perspective view of a secondary battery 100 according to an embodiment of the present invention. FIG. 2 is a cross-sectional view taken along the line II-II of the secondary battery 100 illustrated in FIG. 1.

Referring to FIGS. 1 and 2, the secondary battery 100 includes an electrode assembly 10; first and second electrode terminals 21 and 22; a cap plate 30; a case 40; first and second current collectors 50 and 60; a fuse 70; and an insulating unit 80. In one embodiment, the secondary battery 100 is a rectangular lithium (Li)-ion secondary battery.

The electrode assembly 10 includes a first electrode plate 11, a separator 13 and a second electrode plate 12. The first and second current collectors 50 and 60 are electrically connected to the electrode assembly 10. The first and second current collectors 50 and 60 may be electrically connected to the first and second electrode plates 11 and 12, respectively. The cap plate 30 may be combined with, or covering, an open surface of the case 40 so as to seal the case 40 in which the electrode assembly 10 is accommodated.

The fuse 70, in one embodiment, operates when an overcurrent flows due to overcharging or an abnormal phenomenon, so as to cut off the current flow. In one embodiment, the insulating unit 80 wraps the fuse 70 with an insulating material so as to electrically block the fuse 70 from any external contact.

The electrode assembly 10, in one embodiment, is formed by winding the first electrode plate 11, the separator 13, and the second electrode plate 12 in the form of a jelly roll. However, embodiments of the present invention are not limited thereto, and the electrode assembly 10 may be formed, for example, by alternately stacking the first electrode plate 11, the separator 13, and the second electrode plate 12.

In one embodiment, the first current collector 50 contacts the first electrode plate 11 that is exposed at one end of the electrode assembly 10, and the second current collector 60 contacts the second electrode plate 12 that is exposed at another end of the electrode assembly 10.

The first electrode terminal 21 may be electrically connected to the first current collector 50 and may be partially exposed outward through the cap plate 30. The second electrode terminal 22 may be electrically connected to the second current collector 60 and may be partially exposed outward through the cap plate 30.

In the secondary battery 100, the first electrode plate 11 may be a positive electrode plate, and the second electrode plate 12 may be a negative electrode plate. Also, in one embodiment, the first current collector 50 is a positive electrode current collector, and the second current collector 60 is a negative electrode current collector. Also, the first electrode terminal 21 may be a positive electrode terminal, and the second electrode terminal 22 may be a negative electrode terminal.

The electrode assembly 10 may be formed by winding the first and second electrode plates 11 and 12, and interposing the separator 13, which is an insulator, between the first and second electrode plates 11 and 12. The case 40 accommodates the electrode assembly 10. The first and second electrode terminals 21 and 22 may be positive and negative electrode terminals, respectively. The first and second electrode terminals 21 and 22, in one embodiment, are electrically connected to the first and second electrode plates 11 and 12, respectively, of the electrode assembly 10 so as to be exposed outside the case 40. The cap plate 30 may be combined with an opening of the case 40.

The fuse 70 is a device for protecting a circuit, such as by cutting off an overcurrent that is above a preset value. In one embodiment, when the overcurrent flows, the overcurrent is interrupted from flowing through a circuit as the fuse 70 is melted and cut due to heat generated due to the overcurrent. As such, the stability of a circuit may be ensured.

In one embodiment, the first electrode plate 11, the first current collector 50, the first electrode terminal 21, the second electrode terminal 22, the second current collector 60 and the second electrode plate 12 are electrically connected to form a circuit. Here, if power is input from an external device through the first and second electrode terminals 21 and 22, electricity may be charged between the first and second electrode plates 11 and 12.

In one embodiment, the overcurrent may flow through a circuit from the first electrode plate 11 to the second electrode plate 12 due to overcharging or another abnormal phenomenon. When the overcurrent flows through a circuit, the load on the electrode assembly 10 including the first and second electrode plates 11 and 12 may be excessive and thus an abnormal phenomenon such as an explosion may occur.

However, as the fuse 70 cuts off the overcurrent from flowing through a circuit, the abnormal phenomenon such as an explosion of the secondary battery 100 due to the overcurrent may be prevented or substantially prevented. As such, the stability and reliability of the secondary battery 100 against an abnormal phenomenon due to the overcurrent may be ensured.

The electrode assembly 10 includes the first and second electrode plates 11 and 12, and the separator 13. In one embodiment, the first and second electrode plates 11 and 12, and the separator 13, that is an insulator interposed between the first and second electrode plates 11 and 12, are wound to form the electrode assembly 10.

The first and second electrode plates 11 and 12, in one embodiment, include respective first and second uncoated parts 11a and 12a and first and second coated parts 11b and 12b. The first and second uncoated parts 11a and 12a are regions where an active material is not coated on a current collector (e.g., a current collector formed of a metal foil). The first and second coated parts 11b and 12b are regions where an active material is coated on a current collector (e.g., a current collector formed of a metal foil). In one embodiment, the first and second uncoated parts 11a and 12a are positive and negative electrode uncoated parts, respectively, and the first and second coated parts 11b and 12b are positive and negative electrode coated parts, respectively.

In one embodiment, the first uncoated part 11a is formed at a side end of the first electrode plate 11 in a lengthwise direction of the first electrode plate 11, and the second uncoated part 12a is formed at another side end of the second electrode plate 12 in a lengthwise direction of the second electrode plate 12.

Figure 3:
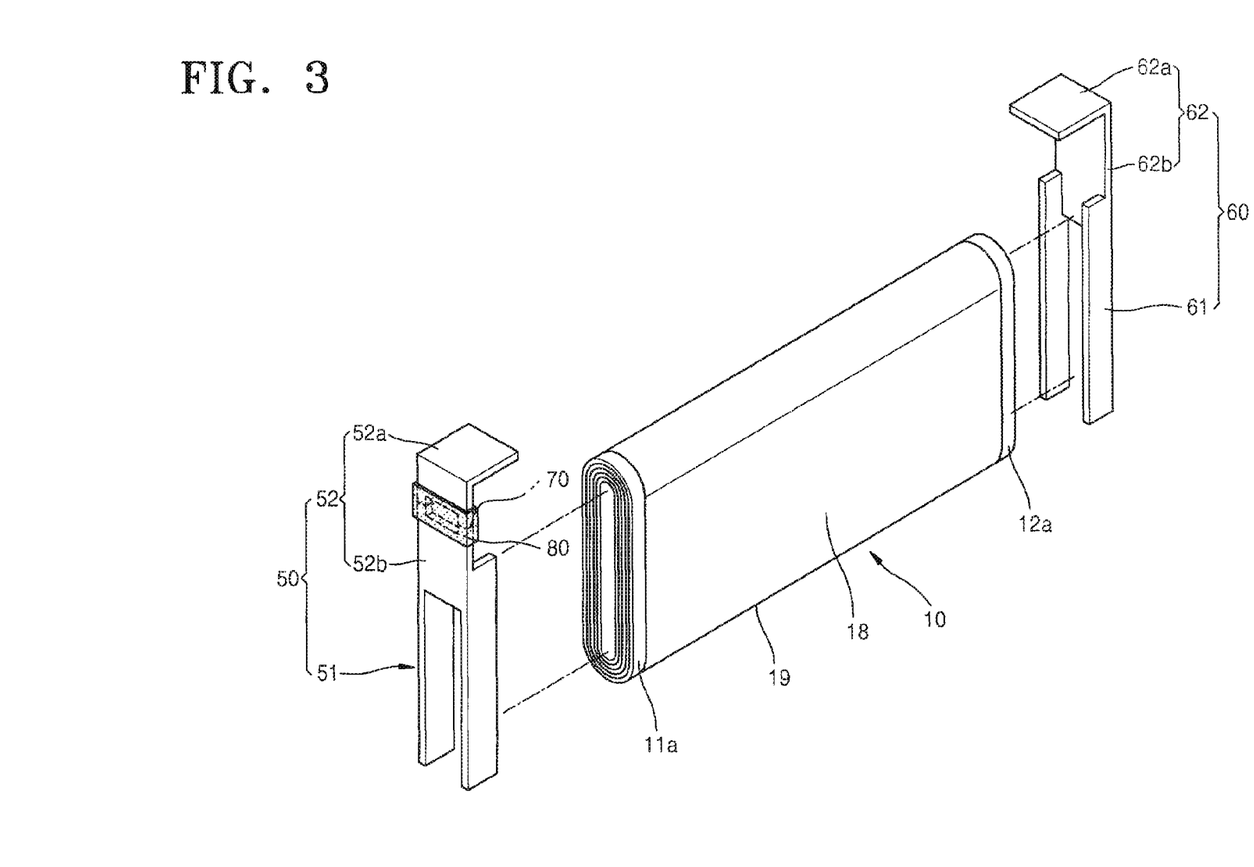
FIG. 3 is a partially exploded perspective view of the secondary battery of FIG. 1 showing a lead member including a current collecting lead unit in which a fuse is formed separated from an electrode assembly.

The electrode assembly 10, in one embodiment, is formed by circularly winding and pressing the first and second electrode plates 11 and 12 and the separator 13. In one embodiment, the electrode assembly 10 is pressed in the form of a plate so as to form planar parts 18 and curved parts 19 as illustrated in FIG. 3.

The planar parts 18 are portions where the outer circumference of the electrode assembly 10 is planar when the first and second electrode plates 11 and 12 and the separator 13 are wound and pressed in the form of a plate. The curved parts 19 are portions where the outer circumference of the electrode assembly 10 is curved at two ends of the planar parts 18. That is, the planar parts 18 are connected to each other at their ends through the curved parts 19.

The case 40 may have a shape of a rectangular can of which one end is open. Through the open end of the case 40, the electrode assembly 10 may be accommodated in the case 40 together with an electrolyte. The cap plate 30, in one embodiment, exposes the first and second electrode terminals 21 and 22 and covers the case 40. In one embodiment, the boundary between the case 40 and the cap plate 30 is laser-welded such that the case 40 in which the electrode assembly 10 is accommodated together with the electrolyte may be sealed. Alternatively, the cap plate 30 may be sealed to the case 40 by any other suitable device or method.

The cap plate 30, in one embodiment, is a thin plate. In one embodiment, an electrolyte inlet 38a through which the electrolyte may be injected is formed in the cap plate 30. After the electrolyte is injected through the electrolyte inlet 38a, a sealing plug 38 may fit in the electrolyte inlet 38a. Also, a vent member 39 in which grooves are formed may be formed in the cap plate 30 so as to be broken according to a set internal pressure.

In one embodiment, first and second terminal holes 21a and 22a are formed in the cap plate 30. The first and second terminal holes 21a and 22a, in one embodiment, are positive and negative electrode terminal holes, respectively. In one embodiment, the first electrode terminal 21 is exposed through the first terminal hole 21a, and the second electrode terminal 22 is exposed through the second terminal hole 22a.

Upper and lower gaskets 25 and 27 may be respectively interposed between the cap plate 30 and the first and second electrode terminals 21 and 22 so as to insulate the cap plate 30 from the first and second electrode terminals 21 and 22.

The lower gaskets 27 fit in the first and second terminal holes 21a and 22a under the cap plate 30 and the upper gaskets 25 fit in the first and second terminal holes 21a and 22a on the cap plate 30. Washers 24 for buffering a coupling force may be arranged on the upper gaskets 25. Threads may be formed on the first and second electrode terminals 21 and 22 and may be engaged with nuts 29 for supporting the first and second electrode terminals 21 and 22 on the case 40.

However, embodiments of the current invention are not limited thereto, and the first and second electrode terminals 21 and 22 may have the form of rivets, for example. In one embodiment, the first and second electrode terminals 21 and 22 may be fixed to the cap plate 30 by protruding portions of the first and second electrode terminals 21 and 22 out of the case 40 through the first and second terminal holes 21a and 22a, fitting the upper gaskets 25 between the first and second terminal holes 21a and 22a and the protruding portions of the first and second electrode terminals 21 and 22, and pressing and spreading the protruding portions of the first and second electrode terminals 21 and 22.

The first current collector 50, in one embodiment, includes a first current collecting plate 51 and a first lead member 52. Similarly, in one embodiment, the second current collector 60 includes a second current collecting plate 61 and a second lead member 62. In one embodiment, the first and second current collecting plates 51 and 61 are positive and negative electrode current collecting plates, respectively, and the first and second lead members 52 and 62 are positive and negative electrode lead members, respectively.

The first current collecting plate 51, in one embodiment, is bonded to the first uncoated part 11a of the electrode assembly 10, such as by using a welding method. In one embodiment, the first current collecting plate 51 is electrically connected to the first electrode terminal 21 via the first lead member 52. As such, the first electrode terminal 21 is connected to the first electrode plate 11 of the electrode assembly 10 via the first lead member 52 and the first current collecting plate 51.

Also, the second current collecting plate 61, in one embodiment, is bonded to the second uncoated part 12a of the electrode assembly 10, such as by using a welding method. In one embodiment, the second current collecting plate 61 is electrically connected to the second electrode terminal 22 via the second lead member 62. As such, the second electrode terminal 22 is connected to the second electrode plate 12 of the electrode assembly 10 via the second lead member 62 and the second current collecting plate 61.

In one embodiment, insulating members 26 are formed between the cap plate 30 and the first and second lead members 52 and 62. The first and second lead members 52 and 62, in one embodiment, respectively include first and second terminal lead units 52a and 62a, and first and second current collecting lead units 52b and 62b. The first and second terminal lead units 52a and 62a are bonded and electrically connected to the first and second electrode terminals 21 and 22. In one embodiment, the first current collecting plate 51 and the first lead member 52 are formed as a single integral unit. Similarly, in one embodiment, the second current collecting plate 61 and the second lead member 62 are formed as a single integral unit. In another embodiment, the first and second current collecting plates 51 and 61 are bonded and electrically connected to the first and second current collecting lead units 52b and 62b, respectively. In one embodiment, the first and second current collecting lead units 52b and 62b are bonded to, or otherwise contacting, and electrically connected to the first uncoated part 11a and the second uncoated part 12a, respectively, of the electrode assembly 10.

According to another embodiment of the present invention, with respect to one of the first and second electrode terminals 21 and 22, the upper gasket 25, the insulating member 26, and the lower gasket 27 for electrically separating the first electrode plate 11 or the second electrode plate 12 from a cap plate 30' may not be formed. In this case, the cap plate 30' and/or the case 40 may be the first electrode terminal or the second electrode terminal.

Figure 6:
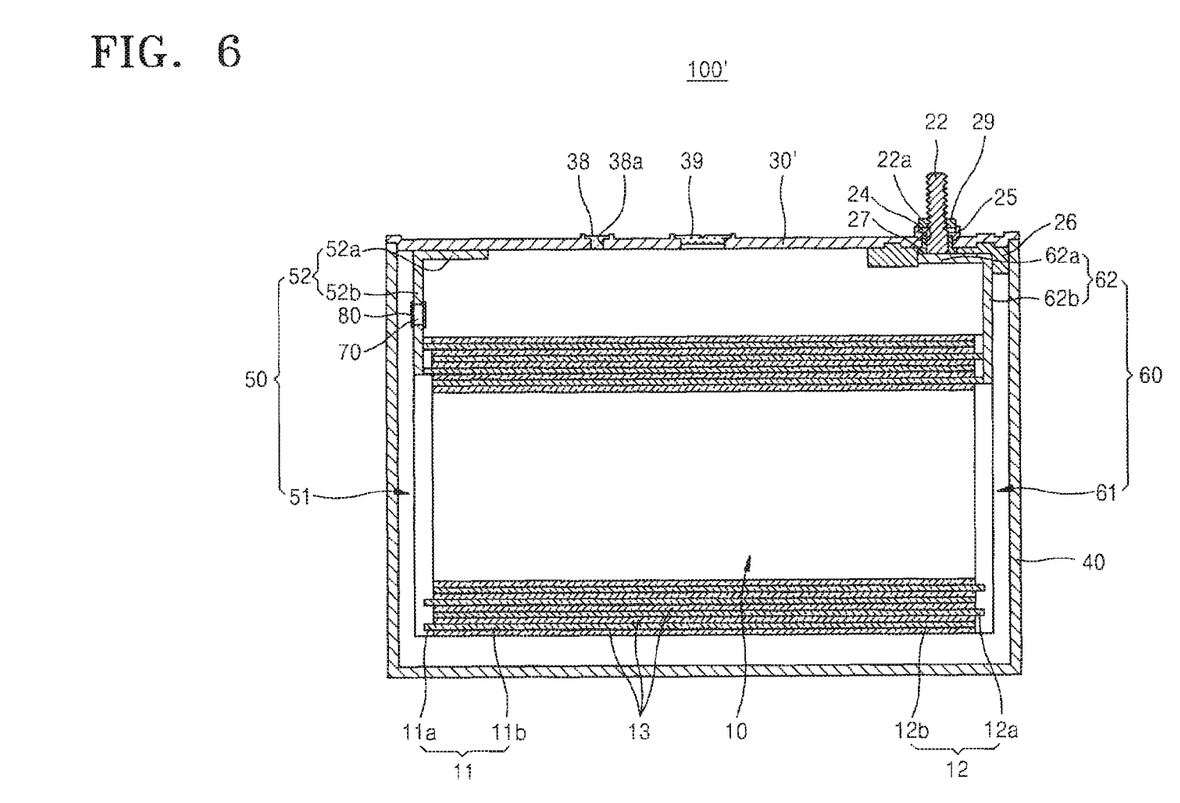
FIG. 6 is a cross-sectional view of a secondary battery according to an embodiment in which the first lead member of FIG. 2 contacts the cap plate directly.

For example, in a secondary battery 100' according to one embodiment, the upper gasket 25 and the lower gasket 27 may not be formed between the cap plate 30' and the first lead member 52, as shown in FIG. 6. In this case, the first lead member 52 contacts the cap plate 30' directly.

In this case, the first electrode terminal 21 may directly contact the cap plate 30 through the first terminal hole 21a without the upper gasket 25 and the lower gasket 27. Also, the first lead member 52 may directly contact the cap plate 30. In this case, the cap plate 30 and the case 40 have the same polarity as the first electrode terminal 21.

In one embodiment, the secondary battery 100 is a Li-ion secondary battery. However, embodiments of the current invention are not limited thereto and, in addition to the Li-ion secondary battery, the secondary battery 100 may be one of various other types of secondary batteries, such as a nickel (Ni)-cadmium (Cd) secondary battery, a nickel-hydrogen (H) secondary battery, or a Li secondary battery.

Further, the secondary battery 100, in one embodiment, is a rectangular battery as illustrated in FIGS. 1 and 2. However, embodiments of the current invention are not limited thereto, and the secondary battery 100 may be one of various other types of batteries, such as a cylindrical battery or a pouch battery.

The first electrode plate 11, the first current collecting plate 51 and the first lead member 52 which are electrically connected to each other may be formed of the same material, such as aluminum (Al), for example, in one embodiment. Also, the second electrode plate 12, the second current collecting plate 61 and the second lead member 62 which are electrically connected to each other may be formed of the same material, such as copper (Cu), for example, in one embodiment.

The fuse 70, in one embodiment, is formed in one or both of the first and second current collectors 50 and 60. In one embodiment, the fuse 70 is formed by making a portion of at least one of the first and second current collectors 50 and 60 thinner than the other portions. In this case, if an overcurrent flows through the first and second current collectors 50 and 60, the resistance of the fuse 70 may be increased in comparison to the other portions so as to increase Joule heat and, thus, the fuse 70 may be melted and cut due to the heat.

As the fuse 70, in one embodiment, may be formed in one of the first and second current collectors 50 and 60 without being formed as an additional element, the secondary battery 100 including the fuse 70 may have a simple structure. The fuse 70 may be formed in at least one of the first and second current collectors 50 and 60.

The fuse 70, in one embodiment, is formed in the first lead member 52 of the first current collector 50 or the second lead member 62 of the second current collector 60. For example, the fuse 70 may be formed in the first current collector 50. In one embodiment, the fuse 70 is formed of Al having a melting point lower than that of Cu and, thus, the performance of the fuse 70 may be improved.

In this case, the fuse 70 may be formed in the first lead member 52 in order to simplify the structure for forming the fuse 70. Also, in one embodiment, the fuse 70 is formed in one of the first and second current collecting lead units 52b and 62b in order to easily ensure a space for the fuse 70 and the insulating unit 80. FIG. 3 is a partially exploded perspective view showing the first lead member 52 including the first current collecting lead unit 52b separated from the electrode assembly 10 in the secondary battery 100, and the fuse 70 being formed, in one embodiment, in the first current collecting lead unit 52b.

In one embodiment, as shown in FIG. 3, the fuse 70 is formed in the first current collecting lead unit 52b. In this case, the fuse 70 may be formed of Al having a melting point lower than that of Cu and, thus, the performance of the fuse 70 may be improved. However, embodiments of the current invention are not limited thereto and, in another embodiment, the fuse 70 may be formed in the second current collecting lead unit 62b.

The electrolyte having a form of liquid or gel may be filled in the case 40 that accommodates the electrode assembly 10. In one embodiment, the first current collector 50 in which the fuse 70 is formed may contact the electrolyte. Also, when the fuse 70 operates due to an overcurrent, a spark may be generated. As such, the spark may react with the electrolyte and thus an explosion may occur.

Accordingly, the secondary battery 100, in one embodiment, includes the insulating unit 80. The insulating unit 80, in one embodiment, is configured to prevent or substantially prevent the fuse 70 from contacting the electrolyte. In one embodiment, the insulating unit 80 wraps the fuse 70 with an insulating material so as to block the fuse 70 from the electrolyte. The insulating unit 80, in one embodiment, includes an insulating tape or an insulation molding (e.g., a resin molding).

As the insulating tape is wrapped around the fuse 70 as an example of the insulating unit 80, the fuse 70 may be electrically blocked from external contact and the structure of the secondary battery 100 may be simplified.

Also, the fuse 70 and the insulating unit 80 may be simply formed and the fuse 70 may protect the secondary battery 100 from an abnormal phenomenon such as overcharging. Also, as the insulating unit 80 blocks the fuse 70 from the electrolyte and, thus, the secondary battery 100 is prevented or substantially prevented from exploding or igniting even when the fuse 70 operates, the stability and reliability of the secondary battery 100 may be ensured.

The electrode assembly 10, in one embodiment, is wound and then pressed flat in the form of a plate, and has an internal space therein. In one embodiment, the first and second current collecting plates 51 and 61 are welded to outside ends of the electrode assembly 10 and are pressing the first and second uncoated parts 11a and 12a, respectively.

In one embodiment, the first and second current collecting plates 51 and 61 respectively contact the first and second uncoated parts 11a and 12a over large areas. Further, in one embodiment, the first and second current collecting plates 51 and 61 are bonded to the outside surfaces of the electrode assembly 10 at opposite ends, such as by using a laser welding method. As shown in FIG. 3, in one embodiment, the first current collecting plate 51 includes two portions extending from the first current collecting lead unit 52b for contacting opposite outside surfaces of the first uncoated part 11a. Similarly, in one embodiment, the second current collecting plate 61 includes two portions extending from the second current collecting lead unit 62b for contacting opposite outside surfaces of the second uncoated part 12a. In one embodiment, the first and second current collecting plates 51 and 61 may be bonded to the ends of the electrode assembly 10 at opposite ends. In one embodiment, the first and second current collecting plates 51 and 61 are bonded by using a laser welding method, and the first and second current collecting plates 51 and 61 may thereby have a greater thickness in comparison to an ultrasonic welding method and, thus, the resistance of the first and second current collecting plates 51 and 61 may be reduced.

As described above, the secondary battery 100 may be prevented or substantially prevented from exploding even when an overcurrent flows due to overcharge or an abnormal phenomenon.

Figure 4:
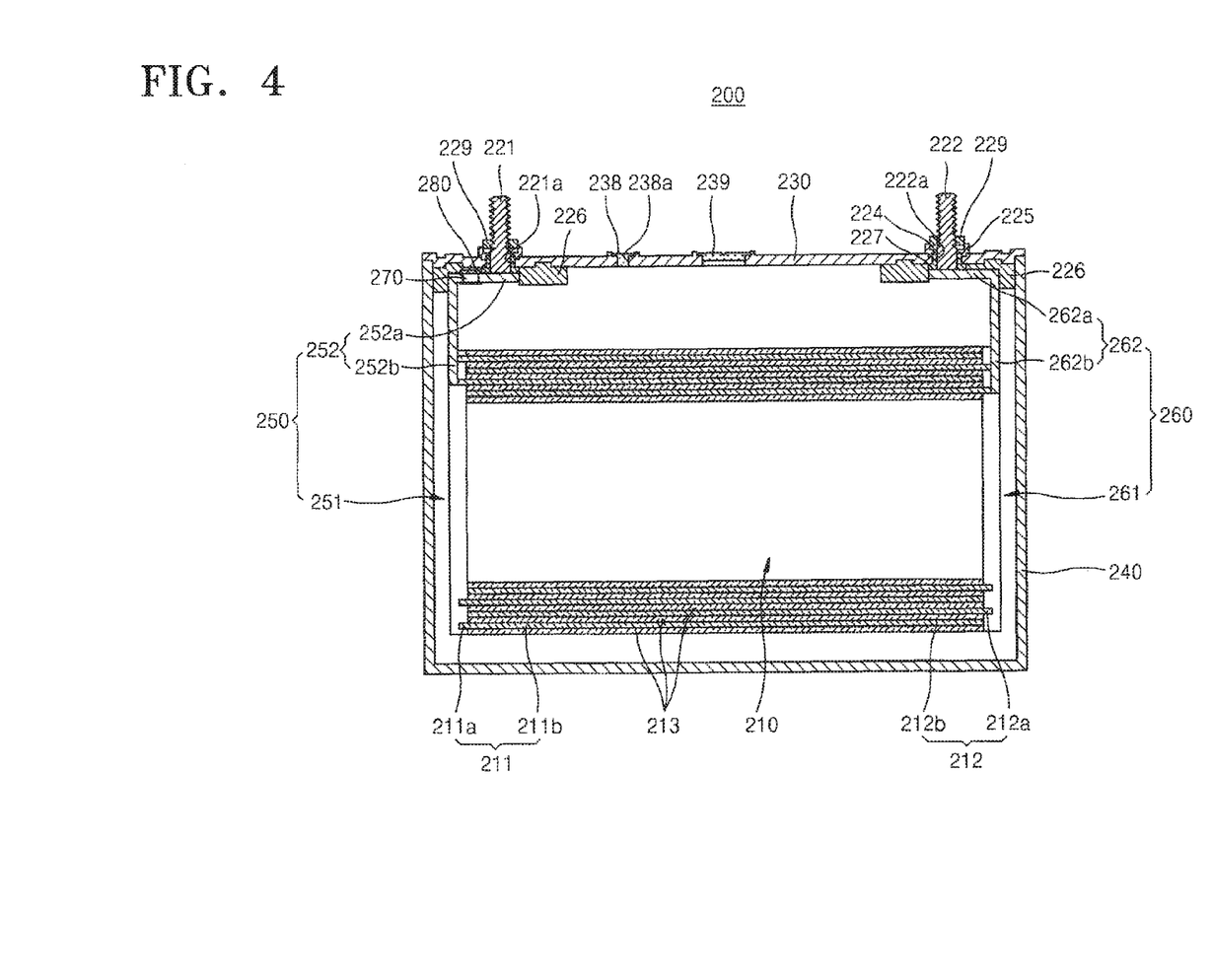
FIG. 4 is a cross-sectional view of a secondary battery according to another embodiment of the present invention.
Figure 5:
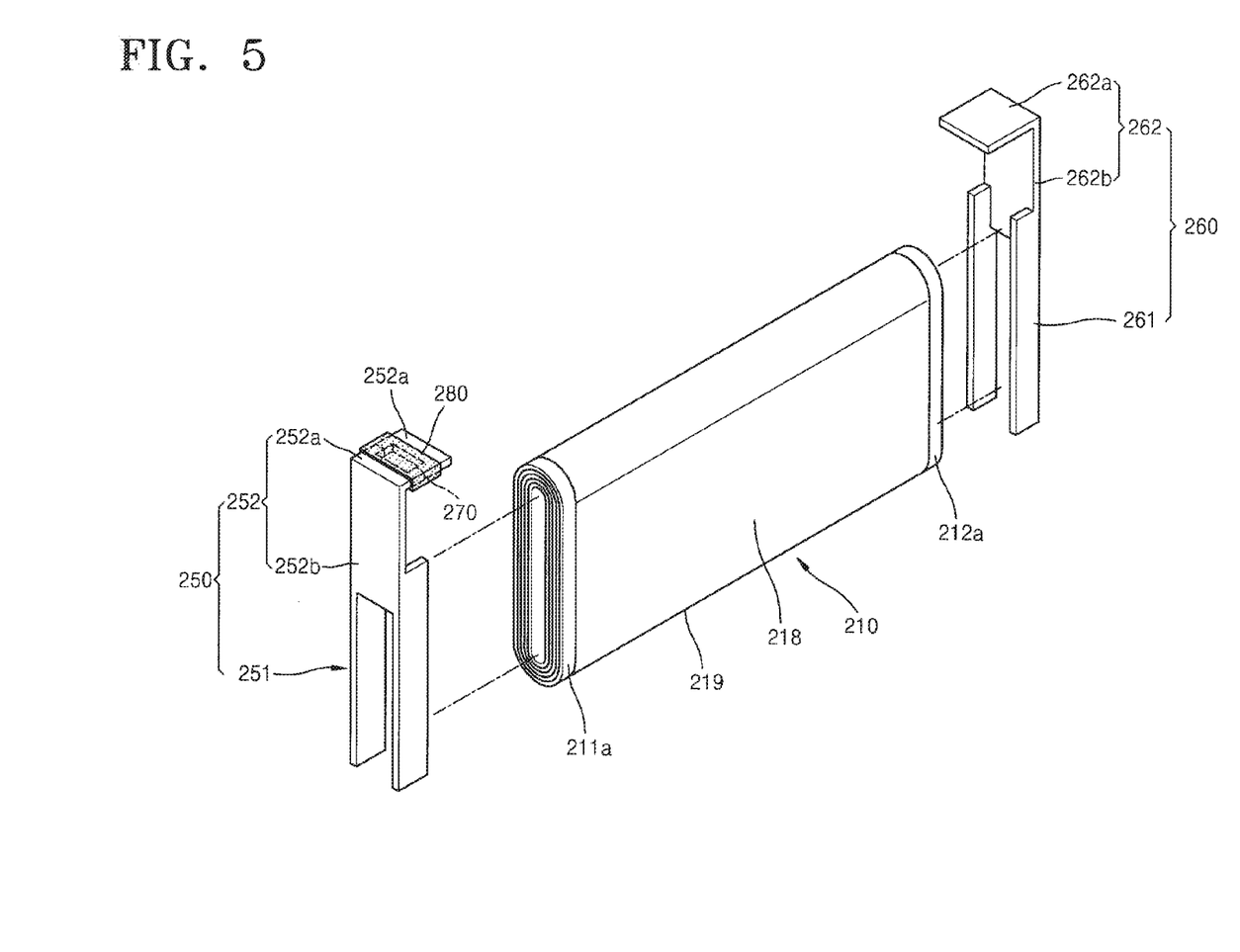
FIG. 5 is a partially exploded perspective view of the secondary battery of FIG. 4 showing a lead member including a terminal lead unit in which a fuse is formed separated from an electrode assembly.

FIG. 4 is a cross-sectional view of a secondary battery 200 according to another embodiment of the present invention. FIG. 5 is a partially exploded perspective view showing a first lead member 252, including a first terminal lead unit 252a in which a fuse 270 is formed, separated from an electrode assembly 210 in the secondary battery 200 illustrated in FIG. 4.

When compared to the secondary battery 100 illustrated in FIG. 2, in the secondary battery 200, the fuse 270 is formed in the first terminal lead unit 252a. Description of like components and structure of the secondary battery 200 that are described above with respect to the secondary battery 100 will not be repeated herein.

Referring to FIGS. 4 and 5, the secondary battery 200, in one embodiment, includes the electrode assembly 210; first and second electrode terminals 221 and 222; a cap plate 230; a case 240; first and second current collectors 250 and 260; the fuse 270; and an insulating unit 280.

The electrode assembly 210, in one embodiment, is formed by winding first and second electrode plates 211 and 212 that may respectively be positive and negative electrode plates, and a separator 213 that is an insulator interposed between the first and second electrode plates 211 and 212. The case 240 accommodates the electrode assembly 210. The first and second electrode terminals 221 and 222, in one embodiment, are positive and negative electrode terminals, respectively.

The first and second electrode terminals 221 and 222, in one embodiment, are electrically connected to the first and second electrode plates 211 and 212, respectively, of the electrode assembly 210 so as to be exposed outside the case 240. The cap plate 230 is combined with, or covering, an opening of the case 240. The first and second current collectors 250 and 260, in one embodiment, are positive and negative electrode current collectors, respectively, that are electrically connected to the first and second electrode plates 211 and 212.

The fuse 270, in one embodiment, operates when an overcurrent flows due to overcharging or an abnormal phenomenon, so as to cut off the current flow. In one embodiment, the insulating unit 280 wraps the fuse 270 with an insulating material so as to electrically block the fuse 270 from any external contact.

In one embodiment, the first electrode plate 211 includes a first uncoated part 211a and a first coated part 211b, and the second electrode plate 212 includes a second uncoated part 212a and a second coated part 212b. In one embodiment, the first and second uncoated parts 211a and 212a are positive and negative electrode uncoated parts, respectively, and the first and second coated parts 211b and 212b are positive and negative electrode coated parts, respectively. In one embodiment, the first electrode terminal 221 is exposed through a first terminal hole 221a that is a positive electrode terminal hole, and the second electrode terminal 222 is exposed through a second terminal hole 222a that is a negative electrode terminal hole.

An electrolyte inlet 238a, in one embodiment, is formed in the cap plate 230, and a sealing plug 238 may fit in the electrolyte inlet 238a. A vent member 239 may also be formed in the cap plate 230. Upper and lower gaskets 225 and 227 may be respectively interposed between the cap plate 230 and the first and second electrode terminals 221 and 222 so as to insulate the cap plate 230 from the first and second electrode terminals 221 and 222. Washers 224 for buffering a coupling force may be arranged on the upper gaskets 225. The first and second electrode terminals 221 and 222 may be coupled with nuts 229. Alternatively, the first and second electrode terminals 221 and 222 may be formed having any other suitable structure, such as in the form of rivets.

In one embodiment, first and second current collecting plates 251 and 261 of the respective first and second current collectors 250 and 260 are bonded to the first and second uncoated parts 211a and 212a, respectively, of the electrode assembly 210, such as by using a welding method. In one embodiment, the first and second current collecting plates 251 and 261 are electrically connected to the first and second electrode terminals 221 and 222, respectively, via first and second lead members 252 and 262 of the respective first and second current collectors 250 and 260.

Insulating members 226, in one embodiment, are formed between the cap plate 230 and the first and second lead members 252 and 262. In one embodiment, the first and second lead members 252 and 262 respectively include first and second terminal lead units 252a and 262a and first and second current collecting lead units 252b and 262b. In one embodiment, the first and second terminal lead units 252a and 262a are bonded and electrically connected to the first and second electrode terminals 221 and 222, respectively. In one embodiment, the first current collecting plate 251 and the first lead member 252 are formed as a single integral unit. Similarly, in one embodiment, the second current collecting plate 261 and the second lead member 262 are formed as a single integral unit. In another embodiment, the first and second current collecting plates 251 and 261 are bonded and electrically connected to the first and second current collecting lead units 252b and 262b, respectively. In one embodiment, the first and second current collecting lead units 252b and 262b are bonded to, or otherwise contacting, and electrically connected to the first uncoated part 211a and the second uncoated part 212a, respectively, of the electrode assembly 210.

In one embodiment, the first current collector 250 includes the first current collecting plate 251 and the first lead member 252, and the second current collector 260 includes the second current collecting plate 261 and the second lead member 262. In one embodiment, the first and second current collecting plates 251 and 261 are positive and negative electrode current collecting plates, respectively, and the first and second lead members 252 and 262 are positive and negative electrode lead members, respectively.

The first current collecting plate 251, in one embodiment, is bonded to the first uncoated part 211a of the electrode assembly 210, such as by using a welding method. In one embodiment, the first current collecting plate 251 is electrically connected to the first electrode terminal 221 via the first lead member 252. As such, in one embodiment, the first electrode terminal 221 is connected to the first electrode plate 211 of the electrode assembly 210 via the first lead member 252 and the first current collecting plate 251.

Also, the second current collecting plate 261, in one embodiment, is bonded to the second uncoated part 212a of the electrode assembly 210, such as by using a welding method. In one embodiment, the second current collecting plate 261 is electrically connected to the second electrode terminal 222 via the second lead member 262. As such, in one embodiment, the second electrode terminal 222 is connected to the second electrode plate 212 of the electrode assembly 210 via the second lead member 262 and the second current collecting plate 261.

Meanwhile, according to another embodiment of the present invention, with respect to one of the first and second electrode terminals 221 and 222, the upper gasket 225, the insulating member 226, and the lower gasket 227 for electrically separating the first electrode plate 211 or the second electrode plate 212 from a cap plate 230' may not be formed. In this case, the cap plate 230' and/or the case 240 may be the first electrode terminal or the second electrode terminal.

Figure 7:
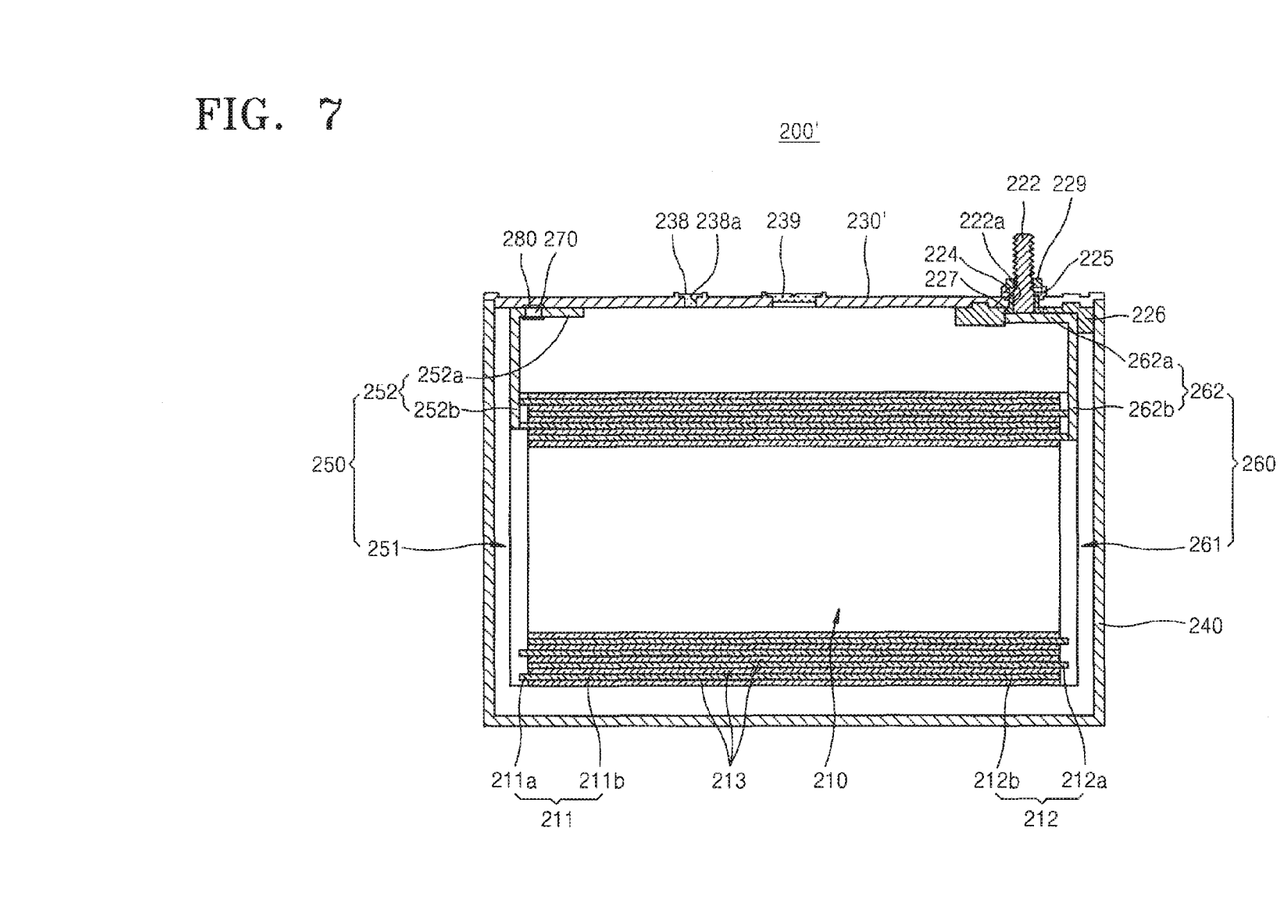
FIG. 7 is a cross-sectional view of a secondary battery according to an embodiment in which the first lead member of FIG. 4 contacts the cap plate directly.

For example, in a secondary battery 200' according to one embodiment, the upper gasket 225 and the lower gasket 227 may not be formed between the cap plate 230' and the first lead member 252, as shown in FIG. 7. In this case, the first lead member 252 contacts the cap plate 230' directly.

As the fuse 270, in one embodiment, is formed in one of the first and second current collectors 250 and 260 instead of being formed as an additional element, the secondary battery 200 including the fuse 270 has a simple structure. The fuse 270 may be formed in at least one of the first and second current collectors 250 and 260.

The fuse 270, in one embodiment, is formed in the first lead member 252 of the first current collector 250 or the second lead member 262 of the second current collector 260. For example, in one embodiment, the fuse 270 is formed in the first current collector 250. In this case, the fuse 270 may be formed of Al having a melting point lower than that of Cu and, thus, the performance of the fuse 270 may be increased, or improved.

In one embodiment, the fuse 270 may be formed in the first lead member 252 in order to further simplify the structure for forming the fuse 270. Also, in one embodiment, the fuse 270 may be formed in one of the first and second terminal lead units 252a and 262a in order to easily ensure a space for the fuse 270 and the insulating unit 280.

As shown in FIG. 5, in one embodiment, the fuse 270 is formed in the first terminal lead unit 252a. In this case, the fuse 270 may be formed of Al having a melting point lower than that of Cu and thus the performance of the fuse 270 may be improved.

In one embodiment, an electrolyte in the form of liquid or gel may be filled in the case 240 that accommodates the electrode assembly 210. In one embodiment, the first current collector 250 in which the fuse 270 is formed may contact the electrolyte. Also, when the fuse 270 operates due to an overcurrent, a spark may be generated. As such, the spark may react with the electrolyte and thus an explosion may occur.

Accordingly, in one embodiment, the secondary battery 200 includes the insulating unit 280. The insulating unit 280 is configured to prevent or substantially prevent the fuse 270 from contacting the electrolyte. In one embodiment, the insulating unit 280 wraps the fuse 270 with an insulating material so as to block the fuse 270 from the electrolyte. The insulating unit 280, in one embodiment, includes an insulating tape or an insulation molding (e.g., a resin molding).

As the insulating tape is wrapped around the fuse 270, in one embodiment, as an example of the insulating unit 280, the fuse 270 may be electrically blocked from any external contact and the structure of the secondary battery 200 may be simplified.

Also, the fuse 270 and the insulating unit 280 may be simply formed and the fuse 270 may protect the secondary battery 200 from an abnormal phenomenon such as overcharging. Also, as the insulating unit 280 blocks the fuse 270 from the electrolyte and thus the secondary battery 200 is prevented or substantially prevented from exploding or igniting even when the fuse 270 operates, the stability and reliability of the secondary battery 200 may be ensured.

As described above, the secondary battery 200 may be prevented or substantially prevented from exploding even when an overcurrent flows due to overcharging or an abnormal phenomenon.

Some exemplary embodiments of the present invention have been disclosed herein, and although specific terms are employed, they are used and are to be interpreted in a generic and descriptive sense only and not for purpose of limitation. Descriptions of features or aspects within each embodiment should typically be considered as available for other similar features or aspects in other embodiments. Accordingly, it will be understood by those of ordinary skill in the art that various changes in form and details may be made without departing from the spirit and scope of the present invention as set forth in the following claims.

What is claimed is:

1. A secondary battery comprising:
an electrode assembly comprising a first electrode plate, a second electrode plate, and a separator between the first electrode plate and the second electrode plate;
a case containing the electrode assembly and an electrolyte;
an electrode terminal electrically connected to the first electrode plate;
a current collector coupled between and electrically connecting the first electrode plate and the electrode terminal, the current collector comprising a current collecting plate coupled to an uncoated part of the first electrode, plate, and a lead member coupled between the electrode terminal and the current collecting plate and contacting the electrolyte;
a fuse formed as a portion of the lead member spaced apart from the first electrode plate and having a smaller cross-sectional area and a higher resistance than other portions of the lead member including portions of the lead member that are adjacent to opposite sides of the fuse and integrally formed with the fuse of a single material; and
an insulating unit covering the fuse of the current collector, the insulating unit exposed to the electrolyte and blocking the fuse from the electrolyte,
wherein the insulating unit surrounds a perimeter of the fuse and a perimeter of the portions of the lead member that are adjacent to the opposite sides of the fuse,
wherein the lead member comprises:
a terminal lead unit coupled to the electrode terminal; and
a current collecting lead unit extending from the terminal lead unit and coupled to the current collecting plate, and
wherein the current collecting lead unit or the terminal lead unit comprises the fuse.

2. The secondary battery of claim 1, wherein the insulating unit has a larger surface than the fuse.

3. The secondary battery of claim 1, wherein the fuse has a higher resistance than portions of the current collector.

4. The secondary battery of claim 1, wherein the electrode terminal protrudes outside the case.

5. The secondary battery of claim 4, further comprising a cap plate sealing an opening of the case, wherein the electrode terminal protrudes through a terminal hole formed in the cap plate.

6. The secondary battery of claim 1, wherein the insulating unit comprises at least one of an insulating tape or an insulation molding.

7. The secondary battery of claim 1, wherein the current collector is formed as a single integral piece.

8. The secondary battery of claim 1,
wherein the electrode terminal is a first electrode terminal, and the secondary battery further comprises a second electrode terminal electrically connected to the second electrode plate and protruding outside the case, and
wherein the current collector is a first current collector, and the secondary battery further comprises a second current collector coupled between and electrically connecting the second electrode plate and the second electrode terminal.

9. The secondary battery of claim 8,
wherein the first electrode plate is a positive electrode plate and the first current collector is a positive current collector, and
wherein the second electrode plate is a negative electrode plate and the second current collector is a negative current collector.

10. The secondary battery of claim 8, wherein the first current collector comprises aluminum, and the second current collector comprises copper.

11. The secondary battery of claim 1, wherein the fuse is configured to melt and disconnect the first electrode plate from the electrode terminal when a current having a magnitude greater than or equal to a set current flows through the current collector.

12. The secondary battery of claim 1, wherein the insulating unit completely covers the fuse.

13. The secondary battery of claim 1, wherein the current collector including the fuse is formed of a single material.

14. The secondary battery of claim 13, wherein the current collector including the fuse is formed of aluminum.

15. The secondary battery of claim 1, wherein the insulating unit wraps the fuse.

\* \* \* \* \*